United States Patent [19]

Kawamura

[11] Patent Number: 5,007,382
[45] Date of Patent: Apr. 16, 1991

[54] CYCLE CHANGEABLE ENGINE

[75] Inventor: Hideo Kawamura, Samukawa, Japan

[73] Assignee: Isuzu Motors Limited, Tokyo, Japan

[21] Appl. No.: 514,445

[22] Filed: Apr. 25, 1990

[30] Foreign Application Priority Data

May 9, 1989 [JP] Japan ................................. 1-114142

[51] Int. Cl.⁵ ........................... F02B 69/06; F01L 9/04
[52] U.S. Cl. ..................................... 123/21; 123/90.11; 123/DIG. 7
[58] Field of Search ............ 123/90.11, 21, 64, DIG. 7

[56] References Cited

U.S. PATENT DOCUMENTS

| | | | |
|---|---|---|---|
| 2,304,407 | 12/1942 | Hogan | 123/21 |
| 4,312,494 | 1/1982 | Aoyama | 123/90.11 |
| 4,392,459 | 7/1983 | Chareire | 123/90.11 |
| 4,515,343 | 5/1985 | Pischinger | 123/90.11 |
| 4,641,613 | 2/1987 | Delesalle | 123/90.11 |
| 4,664,070 | 5/1987 | Meistrick et al. | 123/21 |
| 4,838,218 | 6/1989 | Sato et al. | 123/90.67 |
| 4,907,544 | 3/1990 | Burrahm | 123/DIG. 7 |

FOREIGN PATENT DOCUMENTS

| | | | |
|---|---|---|---|
| 3129609 | 3/1983 | Fed. Rep. of Germany | 123/DIG. 7 |
| 162312 | 9/1984 | Japan | 123/90.11 |
| 2219346 | 12/1989 | United Kingdom | 123/21 |

OTHER PUBLICATIONS

*Engine With Valve Timing Control Mechanism,* vol. 9, No. 300, (M-433) (2023), (11/27/85); & JP-A-60 138 220, Fujitsu, K.K. (7/22/85).
*Valve Made of Ceramics,* vol. 12, No. 286 (M-727) (3133) (8/5/1988); & JP-A-63 705 (3/17/1988), NGK Spark Plug Co., LTD.

Primary Examiner—David A. Okonsky
Assistant Examiner—Weilun Lo
Attorney, Agent, or Firm—Browdy and Neimark

[57] ABSTRACT

This cycle changeable engine includes first intake valves for a four-cycle operation which are disposed in intake ports formed in a cylinder head, exhaust valves disposed in exhaust ports, second intake valves for a two-cycle operation, disposed in intake ports formed at the lower part of a cylinder, and an electromagnetic valve driving device for opening and closing each of the valves by electromagnetic force. The engine includes also a controller which actuates either the first or second intake valves for opening and closing with the others being kept closed in response to a detection signal from detection means for detecting the number of revolutions or load of the engine, and changes the operational condition of the engine to the two-cycle or four-cycle operation. In this manner the engine is operated in the two-cycle operation at a low speed revolution of the engine to improve an output torque and is operated in the four-cycle operation at a high speed revolution of the engine to reduce fuel consumption, to improve mean effective pressure and volume efficiency and to reduce noise.

8 Claims, 3 Drawing Sheets

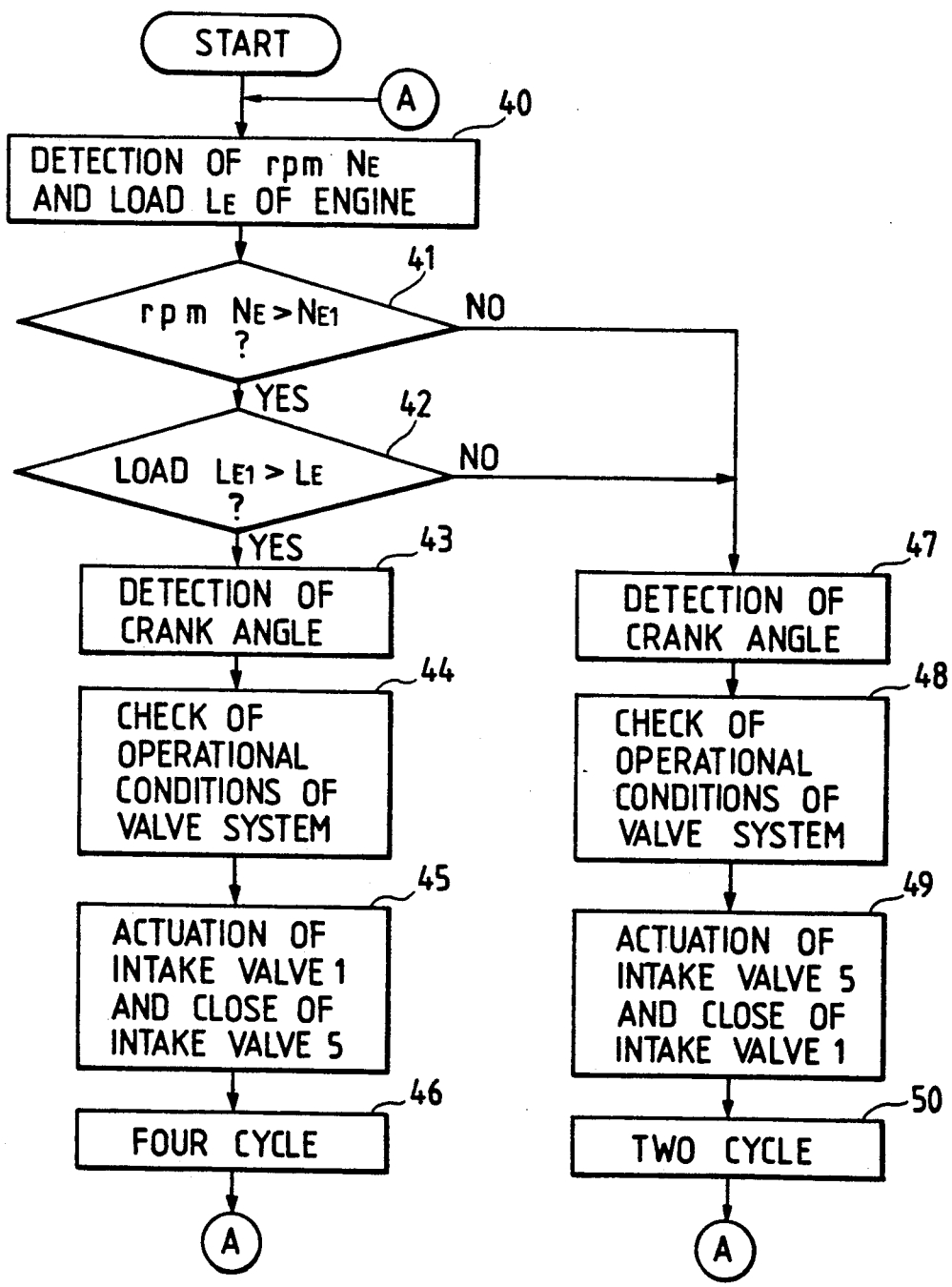

CYCLE CHANGEABLE ENGINE

BACKGROUND OF THE INVENTION

1. Field of the Invention

This invention relates to a cycle changeable engine capable of changing an engine operation to two-cycle operation or four-cycle operation by making opening/closing control of intake/exhaust valves by electromagnetic force.

2. Description of the Prior Art

Conventionally, a valve mechanism which constitutes electrically intake/exhaust valves and acutates them electrically as a valve mechanism of an internal combustion engine is disclosed, for example, in Japanese Patent Laid-Open No. 183805/1983. The valve mechanism of this internal combustion engine includes a detector for detecting the operational condition of the internal combustion engine and actuates the intake and exhaust valves on the basis of the detection signal of the detector. The detector for detecting the operational conditions of the internal combustion engine is accomplished by detecting a rotation state of a crank shaft or by detecting an accelerator opening. The operation of the intake and exhaust valves by the electrical motion means is accomplished by regulating the opening degree of the valve portions in response to the operational conditions of the internal combustion engine such as the intake state of a fuel and an exhaust state of an exploded and burnt matter.

In the operations of gasoline engines and Diesel engines in general, the cycle of the four operations, i.e., an intake stroke, a compression stroke, a combustion stroke and an exhaust stroke, is repeated. Among them, it is only the combustion stroke where power is generated and torque is applied to a crank shaft. In the other three strokes, rotation is effected by the force of inertia. Two kinds of systems, that is, a four-cycle engine and a two-cycle engine, exist as the operation principle of each of these strokes.

The four-cycle engine is the one that requires four strokes of the piston or in other words, two revolutions of the crank shaft in order to effect the four operations described above for each stroke of the piston and to complete one cycle. Accordingly, in the four-cycle engine, one stroke or a sufficient time, is given for the exhaust stroke and the intake stroke so that volume efficiency is high, mean effective pressure is high and efficiency is particularly high in a high speed range. Moreover, since one combustion stroke is carried out per two revolutions of the crank shaft, thermal load to each portion can be reduced. However, a valve mechanism is complicated mechanically and since the number of times of explosion is small, the operation becomes unsmooth if the number of cylinders is small and sufficient torque cannot be secured easily in a low speed range.

In contrast, in the two-cycle engine, the intake stroke and the exhaust stroke are effected at part of the combustion stroke and the compression stroke and one cycle is completed in the two strokes of the piston or in other words, one revolution of the crank shaft. Accordingly, since the number of combustion strokes or the number of times of explosion is twice in the two-cycle engine in comparison with the four-cycle engine, the output becomes about 1.5 times that of the four-cycle engine with the same exhaust quantity. However, since explosion occurs in each cycle in the two-cycle engine, there exists the problem of thermal durability of each component of the engine. Since the time necessary for scavenging in the two-cycle engine is a half of the four-cycle engine, the effective stroke is short and the loss of fresh air is great due to scavenging. It is therefore difficult to improve the mean effective pressure and engine efficiency. Moreover, blow-by is great in the two-cycle and a time area is small so that a fuel consumption quantity is greater than in the four-cycle particularly in the high speed range. Since the exhaust valves are opened earlier than in the four-cycle, an internal pressure becomes high and exhaust noise becomes great.

Demands for engines which are more compact in scale and have higher output will increase in future. As to engine performance, high torque is required in a low speed range but a great torque is not much required in a high speed range. Therefore, an engine which can be used most conveniently can be provided if the engine is constituted so that the torque in the low speed range becomes about twice the torque in the medium speed range. However, an engine having a high torque cannot be produced so easily. If a highly supercharged engine is constituted in order to produce the high torque engine, an excessive load will be applied to the engine main body and a connecting rod, a piston, and the like, will be broken by the force of the mechanical load.

The thermal load to the engine increases with the increase in the number of revolutions of engine. In an engine having a rated number of revolutions of 6,000 rpm, for example, the thermal load becomes six times the thermal load at the time of 1,000 rpm.

SUMMARY OF THE INVENTION

It is an object of the present invention to solve the problems described above and to provide a cycle changeable engine capable of changing two-cycle and four-cycle operations. The cycle changeable engine in accordance with the present invention has the following construction. The cycle changeable engine of the present invention is based on the technical conception that if intake/exhaust valves are made of a light-weight ceramic material, they can be opened and closed by electromagnetic force and can be freely controlled independently of the rotation of a crank by controlling their opening/closing timing and that the output torque of the two-cycle engine is greater than that of the four-cycle engine in the low speed range. Further, in order to satisfy the condition that the high torque is required in the low speed range of the engine but is not much required in the high speed range, as shown in FIG. 4, the engine is operated in the two-cycle operation in the low speed range in order to secure the torque characteristics of the low speed range of the engine and in the four-cycle operation in the high speed range. In this manner, the cycle changeable engine of the invention can improve volume efficiency and mean effective pressure, can reduce the thermal load at each portion, can improve fuel consumption and can reduce the noise.

In this cycle changeable engine, the number of revolutions of the engine can be detected by the rotation sensor disposed in the engine, and a detection signal can be obtained by detecting the load to the engine by detecting in turn the supply quantity of the fuel to a fuel supply device or a step-in quantity of an acceleration pedal.

It is another object of the present invention to provide a cycle changeable engine capable of changing its operation cycle to two-cycle or four-cycle operation, which comprises first intake valves for the four-cycle operation, disposed in intake ports formed in a cylinder head; exhaust valves disposed in exhaust ports formed in the cylinder head; second intake valves for the two-cycle operation, disposed in intake ports formed at the lower part of a cylinder; and electromagnetic valve driving devices for opening and closing these valves by electromagnetic force; and which can reliably change the operation cycle of the engine by actuating either one of the groups of the first and second intake valves while keeping the other group under the closed state.

It is still another object of the present invention to provide a cycle changeable engine capable of changing its operation cycle to two-cycle or four-cycle operation which comprises first intake valves and exhaust valves for the four-cycle, actuated for opening and closing by electromagnetic force and disposed in a cylinder head; second intake valves for the two-cycle, disposed at the lower part of a cylinder; detection means each for detecting the number of revolutions and load of the engine; and a controller for actuating either one of the groups of the first and second intake valves for opening and closing while keeping the other group under the closed state in response to the detection signal from each detection means; and which can change the operation cycle in accordance with the operational conditions of the engine. For example, it can raise and sufficiently secure the low speed torque by changing the operation cycle to the two-cycle operation in the low speed range of the engine, changes the operation cycle to the four-cycle operation in the high speed range to reduce fuel consumption and to improve engine efficiency, and can reduce the thermal load to each portion in comparison with the two-cycle operation.

It is still another object of the present invention to provide a cycle changeable engine which can control the operational conditions of the intake valves described above and the exhaust valves opened and closed by the electromagnetic force, such as the opening/closing timing, valve open time, valve lift quantity, etc, in response to the detection signal by detection means for detecting the crank angle; which can make control in such a manner that even when the operation cycle of the engine is changed, the operational condition of each of the valves described above is changed by electromagnetic force so as to correspond to the cycle thus changed and each valve can be opened and closed; and which can immediately accomplish the cycle change control from the two-cycle to the four-cycle but can easily accomplish the cycle change control from the four-cycle to the two-cycle on the next stroke after stopping for only one stroke.

It is a further object of the present invention to provide a cycle changeable engine which comprises first intake valves and exhaust valves for the four-cycle operation, disposed in a cylinder head and opened and closed by electromagnetic force; second intake valves for the two-cycle operation, disposed at the lower part of a cylinder; detection means each for detecting the revolution and load of the engine; and a controller for changing and controlling either one of the groups of the first and second intake valves for opening and closing while keeping the other group under the closed state in response to the detection signal from each detection means; and which can operate in the two-cycle operation in the low speed range of the engine and in the four-cycle operation in the high speed range.

If the two-cycle operation is carried out in the low speed range of the engine by use of this cycle changeable engine, it is possible to obtain the high torque in the low speed range which is one of the characteristic features of the two-cycle engine, to obtain the high torque which is 1.5 times that of the four-cycle engine, to provide a great output in the low speed range, and to secure the satisfactory operation of the two-cycle engine because the intake valves for the four-cycle operation are kept closed at this time. Since the four-cycle operation is carried out in the high speed range of the engine, it is possible to reduce noise and fuel consumption, to improve volume efficiency and mean effective pressure, to reduce the thermal load to each portion, to improve fuel consumption and to reduce the noise. Since the intake valves for the two-cycle operation are kept closed in this instance, the loss of the output does not occur.

BRIEF DESCRIPTION OF THE DRAWINGS

FIG. 3 is a processing flowchart showing an embodiment of a controller of the cycle changeable engine which assembles therein the electromagnetic valve driving device.

DETAILED DESCRIPTION OF THE EMBODIMENT

Hereinafter, an embodiment of the cycle changeable engine for changing over between two-cycle and four-cycle operations in accordance with the present invention will be described with reference to the drawings.

Figure 1:
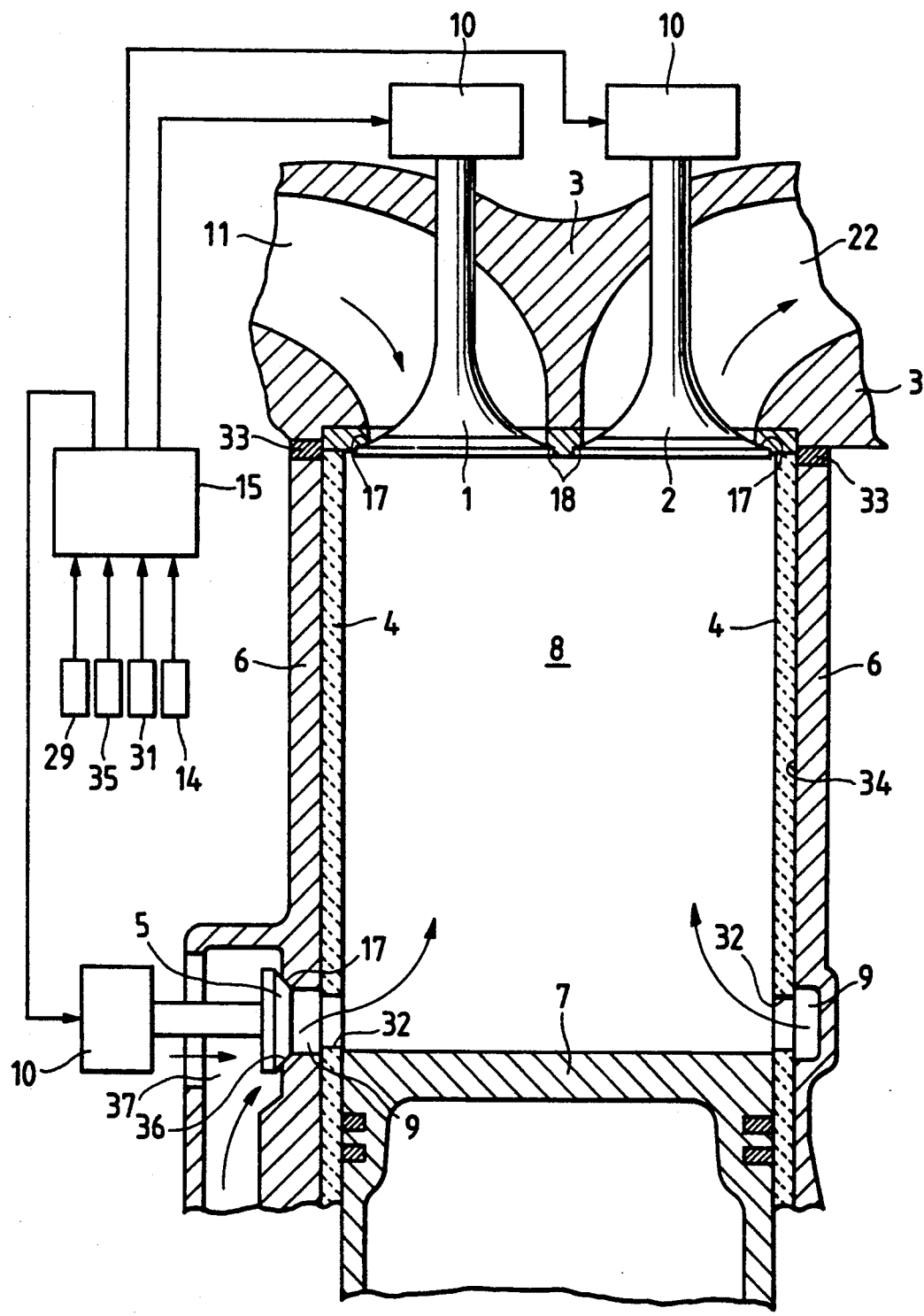
FIG. 1 is a schematic view useful for explaining an embodiment of a cycle changeable engine in accordance with the present invention.

FIG. 1 shows an embodiment of the cycle changeable engine capable of changing over between two-cycle and four-cycle operations in accordance with the present invention. A cylinder linear 4 is fitted to each cylinder 34 formed in a cylinder block 6 that constitutes an engine and a cylinder head 3 is fixed to the upper surface of the cylinder block 6 through a gasket 33. A piston 7 is disposed inside the cylinder liner 4 in such a manner as to be capable of reciprocation. A combustion chamber 8 is the chamber which is defined by the cylinder liner 4, the cylinder head 3 and the piston 7. Intake ports 11 and exhaust ports 22 are formed in the cylinder head 3 and a valve seat 18 is disposed in each of these ports. An intake valve 1 which opens and closes when the engine operates as a four-cycle engine is disposed on the valve seat 18 of the intake port 11 and an exhaust valve 2 which opens and closes when the engine operates either the two-cycle or four-cycle engine is disposed on the valve seat 18 of the exhaust port 22.

Further, a ring like intake port 9 is formed on the inner peripheral portion at the lower part of the cylinder block 6 and a plurality of intake openings 32 are formed at the lower part of the cylinder line 4 in such a manner as to correspond to the intake ports 9. In order to introduce intake air into the intake ports 9, an air introduction portion 37 is formed at the lower part of the cylinder block 6 and intake openings 36 are formed so as to communicate this air introduction portion 37 with the intake ports 9. A valve seat portion is formed in each intake opening 36. An intake valve 5 which opens and closes when the engine operates as the two-cycle engine is disposed on the valve seat portion. Though only one intake valve 5 is shown disposed in the drawing, a plurality of intake valves may of course be disposed at the lower part of the cylinder in the peripheral direction in order to such uniformly large quantities of intake air from the peripheral direction into the combustion chamber 8. Intake air can also be introduced naturally by a compressor of a turbo-charger.

In the cycle changeable engine for changing over between two-cycle and four-cycle operations, the intake valves 1, 5 and the exhaust valve 2 are made of a non-magnetic light-weight ceramic material and are opened and closed by the electromagnetic force of an electromagnetic valve driving device, that is, by a valve lifter 10. This valve lifter 10 of the electromagnetic valve driving device is controlled by a controller 15 which receives detection signals from later-appearing rotation sensor 14 for detecting the number of revolutions of the engine, a load sensor 31 for detecting an engine load, a position sensor 35 for detecting a stroke position of the piston 7 or in other words, a crank angle, and intake flow rate sensor 29 for detecting the intake air flow rate, and generates an instruction in response to each of these detection signals.

Next, an example of the electromagnetic valve driving device capable of opening and closing the intake and exhaust valves in this cycle changeable engine capable of changing over between two-cycle and four-cycle operations will be explained with reference to FIG. 2. As to the components in this electromagnetic valve driving device, like reference numerals are used to identify those components which have the similar functions as the engine components shown in FIG. 1.

Figure 2:
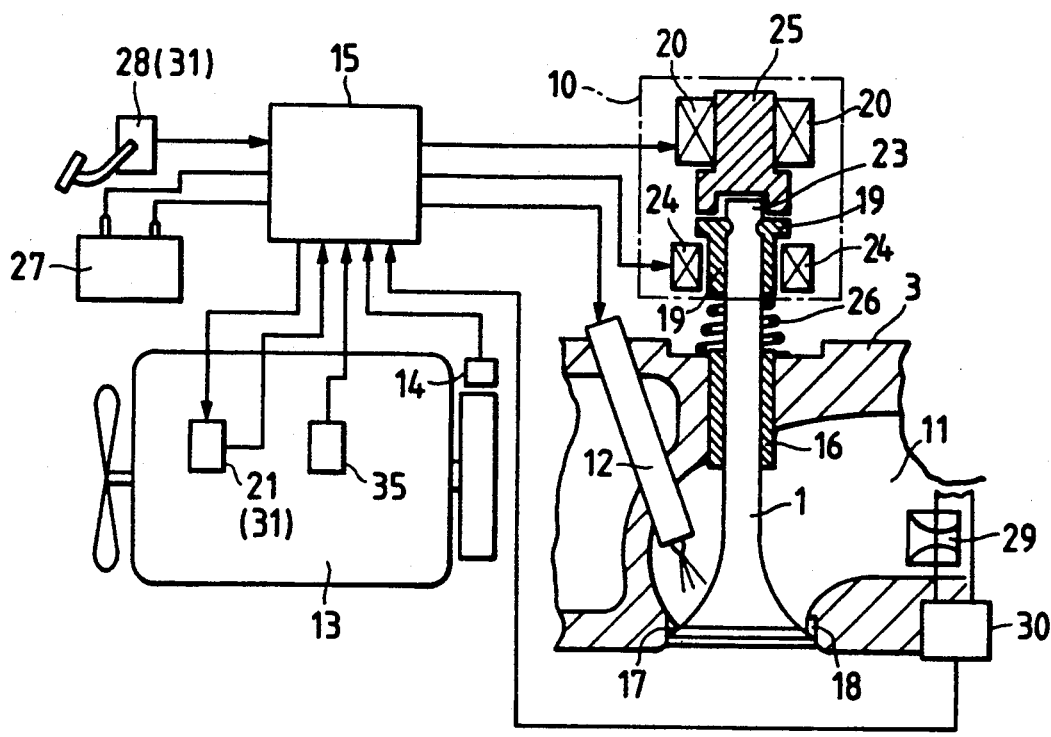
FIG. 2 is an explanatory view showing an example of an electromagnetic valve driving device to be assembled in the cycle changeable engine in accordance with the present invention.

As shown in FIG. 2, the electromagnetic valve driving device is assembled in the engine 13, and the principal portions of this electromagnetic valve driving device are shown conceptually under the state where they are taken out from the engine 13. A fuel injection device 21 for controlling the supplied fuel to the engine 13 has an injection nozzle 12. This nozzle 12 is inserted from the upper part of the cylinder head 3 into the intake port 11 and the fuel injected from a nozzle hole is atomized and introduced into the cylinder. The fuel injection device 21 is controlled by the instruction from the controller 15 so as to inject a predetermined quantity of fuel. The rotation sensor 14 is disposed for the output shaft of the engine 13 and detects the number of revolutions of the engine. The detected value of the number of revolutions of the engine, that is, the rotation signal, is inputted to the controller 15. The intake valve 1 is made of a ceramic material and is disposed in such a manner as to be capable of sliding vertically while being guided by a valve guide 16 which is fixed to the cylinder head 3.

Though only the electromagnetic valve driving device for the intake valve 1 is shown disposed in the drawing, the electromagnetic valve driving devices are disposed also for the intake valve 5 and the exhaust valve 2 in such a manner as to be capable of being operated electromagnetically in the cycle changeable engine of this invention.

When the intake valve 1 moves up and down, the valve face 17 of the intake valve 1 comes into contact with and separates from the valve seat 18 disposed on the intake port 11 of the cylinder head so that the intake port 11 is opened and closed. Accordingly, the intake air flow rate into the cylinder of the engine 13 is controlled by the opening and closing operation of these intake ports 11 or their opening quantity A movable element 19 made of a magnetic material such as soft iron is fixed at the upper end 23 of the intake valve 1 and a movable element coil 24 is fitted to this movable element 19. A stationary element 25 made of a magnetic material such as soft iron is disposed on the cylinder head 3 above the mcvable element 19 and a stationary element coil 20 is disposed in the stationary element 25. Accordingly, when the movable element coil 24 and the stationary element coil 20 are energized/cut off, the stationary element 25 attracts/separates the movable element 19, thereby actuating the intake valve 1 up and down.

In the drawing, a valve spring 26 is shown disposed between the valve spring seat formed on the upper surface of the cylinder head 3 and the movable element 19. Though the detailed disposition structure of this valve spring 26 is not shown in the drawing, this valve spring 26 may be either a tensile spring or a compression spring and the spring force of the valve spring 26 has a righting action acting in the opposite direction to the electromagnetic force. Accordingly, if the intake valves 1, 5 and the exhaust valve 2 are opened by the electromagnetic force of the respective valve lifters 10, the intake valves 1, 5 and the exhaust valve 2 are closed by the spring force of the valve spring 26.

Further, as to the intake/exhaust valves which are actuated by the electromagnetic force, the material forming the intake/exhaust valves themselves is preferably a ceramic material to reduce the weight and is preferably a non-magnetic ceramic material in order to prevent attraction of iron powder or the like to the valve face 17 of the intake/exhaust valves and to the sliding portion of the valve stem. If iron powder or the like is attracted to the valve face 17 and to the sliding portion of the valve stem, the tight close state of the intake/exhaust ports by the intake/exhaust valves gets deteriorated and since frictional resistance of the sliding portion becomes great, undesirable conditions such as seizure will occur. Therefore, in order to actuate the intake/exhaust valves by the electromagnetic force, the movable element 19 made of the magnetic material is separately disposed at the upper end portion of the intake/exhaust valves. If the intake/exhaust valves are constituted in the manner described above, the stationary element 25 can separate or attract the mcvable element 19 against the biasing force of the spring 26 when a controlled current from the controller 5 is supplied to or cut off from the movable element coil 24 and the stationary element coil 20, so that the intake valves 1 can move down or up and the valve face 17 of each intake valve 1 can open or close the intake port 11.

In this electromagnetic valve driving device, the controller 15 receives each of the detection signals detected by the rotation sensor 14, load sensor 31 and position sensor 35, passes the current to the stationary element coil 20 and to the movable element coil 24 in the valve lifter 10 of the electromagnetic valve driving device in response to the detected load signal and can thus actuate each valve by exciting the electromagnet. The load sensor 31 of the engine 13 is for detecting the engine load and can detect it by detecting the fuel supply quantity supplied from the injection nozzle 12 of the fuel injection device 21 to the engine 13 or by detecting the step-in quantity of an acceleration pedal 28. In other words, the load sensor 31 can be constituted by a detection sensor for the fuel supply quantity to the engine and/or a detection sensor for the step-in quantity of the acceleration pedal 28. Therefore, the electromagnetic valve of each of the intake/exhaust valves can be controlled by inputting the fuel supply quantity to the engine 13 and/or the step-in quantity signal of the acceleration pedal 28 as the load signal of the engine to the controller 15. The position sensor 34 of the engine 13 is for detecting the stroke position of the piston 7 and can detect the position by detecting a crank angle. The intake air flow rate sensor 29 is disposed in the intake pipe forming each intake port 11. This intake air flow rate sensor 29 detects the air flow impinging against a heating wire through which a current flows, by the change of the resistance value of the heating wire, and the signal from this intake air flow rate sensor 29 is inputted to an intake air flow rate processor 30 and can detect the intake air flow rate flowing through each intake port 11. The intake air flow rate thus detected is inputted to the controller 15.

The controller 15 comprises a microcomputer and is equipped with a central processing unit for executing operational processing, various memories for storing the sequence of the operational processing, control means, etc., and input/output ports. When various signals are inputted from the afore-mentioned various sensors and the intake air flow rate processor 30, the controller 15 executes the processing in accordance with the sequence stored in the memory, generates a control instruction to the electromagnetic coils 20, 24 for the valve mechanisms for opening and closing the intake valve 1 and the exhaust valve, and controls the opening and closing operation of these intake/exhaust valves. Besides the opening/closing operation of the intake/exhaust valves, the controller 15 operates a valve opening, a valve lift quantity, a valve timing, a valve opening time, a fuel injection timing, and the like, and generates the control instruction in accordance with the operation result. Incidentally, reference numeral 27 in the drawing represents a battery, which operates as the power source for the controller 15 and various coils for the valve mechanisms.

Next, an embodiment of a controller for actuating this cycle changeable engine will be explained with reference to FIGS. 1, 2 and 3. FIG. 3 is a processing flowchart showing an example of the operation of this cycle changeable engine.

In the cycle changeable engine capable of changing over between two-cycle and four-cycle operation in accordance with the present invention, the intake valve 5 and the exhaust valve 2 are opened and closed when the engine 13 operates as the two-cycle engine, whereas the intake valve 1 and the exhaust valve 2 are opened and closed when the engine 13 operates as the four-cycle engine. The engine has control means or in other words, the controller 15, including detection means for detecting the rotation of the engine 13, that is, the rotation sensor 14, the detection means for detecting the engine load state, that is, the step-in quantity sensor 28 for detecting the step-in quantity of the acceleration pedal 28 and/or the fuel supply quantity sensor for detecting he fuel supply quantity injected from the injection nozzle 12 of the fuel injection device 21 into the cylinder, and controls either one of the intake valves 1 and 5 to the closed state in response to the rotation signal of below a predetermined number of revolutions of the engine given thereto from the rotation sensor 14 or in response to the load signal representing that the engine load is above a predetermined load, given thereto from the step-in quantity sensor and/or from the fuel supply quantity sensor. If either one of the intake valves 1 and 5 are opened with the other being kept closed in response to the detection signal representing that the engine revolution is lower or higher than the predetermined number of revolutions and to the detection signal representing that the engine load is lower or higher than the predetermined load, the engine 13 can be actuated either as the four-cycle engine or as the two-cycle engine.

An embodiment of the cycle changeable engine capable of changing two-cycle and four-cycle operation in accordance with the present invention will be explained with reference to the flowchart of FIG. 3. The electromagnetic valve driving apparatus is first driven and controlled with the start of the engine. As the first step, when the engine 13 is actuated rpm $N_E$ of the engine is detected by the rotation sensor 14 and this detection signal is inputted to the controller 15. The step-in quantity detection signal detected by the detection sensor for the step-in quantity of the acceleration pedal is inputted as the load signal of the engine 13 to the controller 15. Alternatively, the fuel supply quantity injected from the injection nozzle 12 of the fuel supply device 21 is detected by the fuel supply quantity detection sensor and this detection fuel supply quantity signal is inputted as the load signal of the engine 13 to the controller 15 (step 40).

Figure 4:
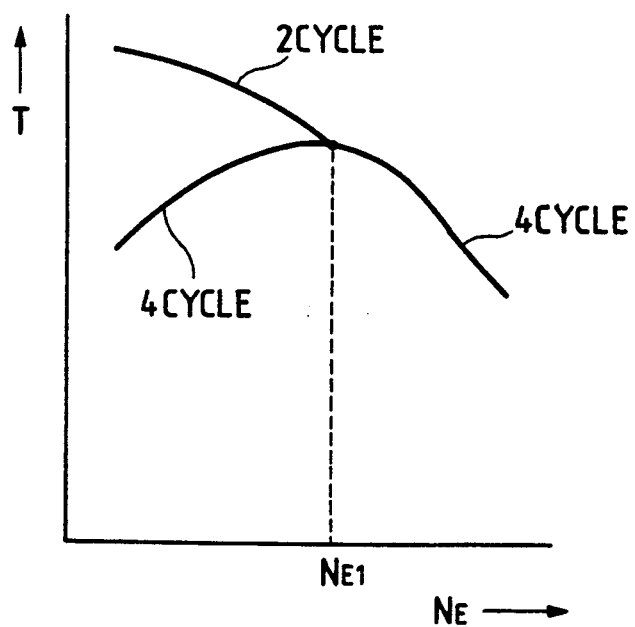
FIG. 4 is a diagram showing the relationship between the number of revolutions of the engine and the torque, and represents that the cycle is changed with rpm $N_{E1}$ as the boundary in the cycle changeable engine in accordance with the present invention.

Whether or not rpm $N_E$ detected by the rotation sensor 14 is greater than the predetermined rpm $N_{E1}$ that is calculated in advance is judged. In this case, the predetermined rpm $N_{E1}$ is the number of revolutions when it is desired to change the operation cycle of the engine 13 as shown in FIG. 4. If rpm $N_E$ of the engine 13 is smaller than the predetermined rpm $N_{E1}$ or in other words, within the low speed range, the low speed torque is small and a sufficient torque cannot be secured by the four-cycle operation. Therefore, the operation is changed to the two-cycle operation in order to set the engine to the high torque. In contrast, when rpm $N_E$ of the engine 13 is higher than the predetermined rpm $N_{E1}$ or in other words, within the high speed range, the high torque is not required. Accordingly, the engine is operated in the four-cycle operation (step 41).

When rpm $N_E$ of the engine is greater than the predetermined rpm $N_{E1}$, load $L_E$ is detected by the engine load sensor 31. This load $L_E$ can be detected by the detection signal detected by the detection sensor of the fuel supply quantity to the engine 13 and/or the detection signal detected by the detection sensor for the step-in quantity of the acceleration pedal 28. Whether or not the load $L_E$ is greater than a predetermined load $L_{E1}$, which is calculated in advance and at which the engine is preferably operated by changing its operation cycle, is judged (step 42).

If the load $L_E$ is smaller than the predetermined load $L_{E1}$, the high torque is not required for the engine 13 so that the engine 13 can be operated sufficiently in the four-cycle operation. It is possible to improve volume efficiency and mean effective pressure of the engine 13, to improve the fuel consumption quantity by reducing the thermal load at each portion and to reduce the noise by operating the engine 13 in the four-cycle operation. In other words, the detection signal of the load $L_E$ by the load sensor 31 is inputted to the controller 15 and receiving this detection signal, the controller 15 detects the stroke position of the piston 7 or in other words, the crank angle, by the position sensor 35 in order to establish the conditions for the operation of the engine 13 in the four-cycle operation in response to the detection signal described above, the detection signal of the crank angle being inputted to the controller 15 (step 43).

In order to make control so that the intake valve 1 and the exhaust valve 2 are actuated by each valve lifter 10 of the electromagnetic valve driving device, the operational conditions of the valve lifters 10 of the intake and exhaust valves 1, 2, that is, the operational conditions of the valve driving system, are checked (step 44).

When any abnormality does not exist in the operational conditions of the valve driving systems of the intake and exhaust valves 1 and 2, the controller 13 generates an instruction to the valve lifter 10 of the intake valve 1 in response to the detection signal of the crank angle by the position sensor 35, supplies the current to the stationary and movable element coils 20 and 24 in the valve lifter 10 of the intake valve 1 and makes opening/closing control of the intake valve 1. It also makes control so as to keep the other intake valve 5 under the closed state. In other words, while the actuation of the intake valve 5 is stopped and kept under the closed state in order to actuate the engine 13 in the four-cycle operation by the instruction from the controller 15, control is made in such a manner as to actuate the intake valve 1 and to suck the intake air via the intake ports 11 formed on the cylinder head 3 into the combustion chamber 8 (step 45).

If the operational conditions for the four-cycle operation described above are established, the operation of the valve lifters 10 of the intake and exhaust valves 1 and 2 is controlled by the electromagnetic force by the instruction from the controller 15 in order to control the valve timing of the intake and exhaust valves 1 and 2 to the optimum state. In other words, since the valve lifters 10 can be controlled independently of the crank shaft, the control of the intake air quantity into the combustion chamber 8 and the control of the valve timing can be made to the optimum state in accordance with the number of revolutions and load of the engine 13, and the engine 13 can be operated in the suitable four-cycle operation. At this time, since the intake valve 5 disposed at the intake port 9 at the lower part of the cylinder is closed, lekage of the intake air and the exhaust gas does not occur from the intake port 9 and the loss of the engine output does not occur (step 46).

When the rpm $N_E$ of the engine is smaller than the predetermined rpm $N_{E1}$ or when the load $L_E$ is greater than the predetermined load $L_{E1}$, control is made so that the engine 13 operates in the two-cycle operation with the high torque. For example, when the vehicle is started as the engine 13 is under the operational condition and the vehicle is at halt or under the parking state, the control of changing the operation cycle of the engine 13 is made so as to operate the engine 13 in the two-cycle operations and to obtain the high torque in the low speed range if the vehicle starts with a heavy load or drives on an upward slope with the small number of revolutions of the engine 13 or with the great load.

In other words, the operation of the engine 13 is changed to the two-cycle operation by the instruction from the controller in order to obtain the high torque when the engine 13 is in the low speed range or when it receives the high load. The detection signal of rpm $N_E$ of the engine by the rotation sensor 14 or the detection signal of the load $L_E$ by the load sensor 31 is inputted to the controller 15 and on receiving this detection signal, the controller 15 changes the engine operation from the four-cycle to two-cycle operation, detects the stroke position of the piston 7, that is, the crank angle, by the position sensor 35, in order to establish the conditions for the operations of the cycle conversion operation for changing the operation cycle of the engine 13 from the four-cycle to two-cycle operation and causing it to operate in the two-cycle operation, that is, the conditions for actuating the intake valve 5 disposed at the lower part of the cylinder liner 4 or at the lower part of the cylinder and the exhaust valve 2 disposed in the cylinder head 3 and then inputs the detection signal of the crank angle (step 47).

Further, the operational conditions of the valve lifters 10 of the intake and exhaust valves 5 and 2, that is, the operational conditions of the valve driving system are checked in order to control the actuation of the intake and exhaust valves 5 and 2 by the electromagnetic force of the valve lifters 10 of the electromagnetic valve driving device (step 48).

If no abnormality is found as a result of the check of the operational conditions of the valve driving system of the intake and exhaust valves 5 and 2, the crank angle or the stroke position of the piston 7 is detected by the position sensor 35 and this detection signal is inputted to the controller 15. On receiving this detection signal, the controller 13 issues the instruction to the valve lifter 10 of each of the intake and exhaust valves 5 and 2, supplies the current to the stationary element coil 20 and movable element coil 24 of the valve lifter 10 of each of the intake and exhaust valves 5 and 2 and actuates and makes the open/close control of these valves 5 and 2. The other intake valve 1 is kept closed. In other words, the actuation of the intake valve 1 is stopped and kept under the closed state in order to operate the engine 13 in the two-cycle operation by the instruction from the controller 15 and to control the actuation of the intake valve 5, and control is also made so as to suck the intake air via the intake ports formed at the lower part of the cylinder block 6 into the combustion chamber 8 (step 49).

When the operational conditions for the two-cycle operation described above are established, the operation of the valve lifter 10 of each of the intake and exhaust valves 5 and 2 is controlled by the electromagnetic force by the instruction from the controller 15 in order to control the valve timing of the intake and exhaust valves 5 and 2 to the optimum state. In other words, since the valve lifter 10 can be controlled independently of the crank shaft, the control of the intake air quantity into the combustion chamber 8 and the valve timing control can be adjusted appropriately to the optimum state in accordance with the number of revolutions and load of the engine. Moreover, since the intake valve 1 is controlled and kept closed and the intake ports 11 is blocked, the engine 13 can be operated in the appropriate tow-cycle operation (step 50).

What is claimed is:

1. A cycle changeable engine capable of changing over its operating cycle to either one of two-cycle or four-cycle operation, comprising:
a cylinder block;

cylinder liners, each being fitted into each of cylinders formed in said cylinder block;

a cylinder head disposed fixedly in said cylinder block;

first intake ports and exhaust ports, each being formed in said cylinder head;

first intake valves for a four-cycle operation, each being disposed in each said first intake port;

exhaust valves, each being disposed in each said exhaust port;

intake openings formed at lower peripheral portion of said cylinder liners;

second intake ports formed at the lower port of said cylinder block and communicating with said intake openings;

second intake valves for a two-cycle operation being disposed in each said second intake port;

electromagnetic valve driving devices for opening and closing said first intake valves, said exhaust valves and said second intake valves, respectively, by electromagnetic force;

detection means for detecting the operational conditions of said engine, said detection means including a rotation sensor for detection of the number of revolutions of said engine; and a controller for opening and closing either one of the groups of said first intake valves and said second intake valves and keeping the other group under the closed state in response to the detection signal by said detection means; wherein in response to the detection signal from said rotation sensor representing that the engine speed is a low speed, said first intake valves are kept closed and said second intake valves are opened and closed while said engine is operated in the two-cycle operation.

2. A cycle changeable engine according to claim 1, wherein each of said first intake valves, said second intake valves and said exhaust valves are made of a non-magnetic ceramic material.

3. A cycle changeable engine according to claim 1, wherein each of said electromagnetic valve driving devices includes a movable element made of a magnetic material and fixed to the upper end portion of each of said valves, a movable element coil for actuating said movable element, a stationary element made of a magnetic material and disposed above said movable element in such a manner as to face said movable element, a stationary element coil for actuating said stationary element, and a valve spring for returning said movable element.

4. A cycle changeable engine according to claim 1, wherein said detection means includes a load sensor for detecting the load of said engine.

5. A cycle changeable engine according to claim 1, wherein said detection means includes a position sensor for detecting a crank angle, and said controller controls the operational conditions of said first intake valves, said second intake valves and said exhaust valves in response to the detection signal by said position sensor.

6. A cycle changeable engine according to claim 1, wherein the cycle change from the four-cycle operation to the two-cycle operation in the cycle change control of the operational condition of said engine by said controller is suspended for one stroke and is started on the next stroke.

7. A cycle changeable engine according to claim 1, wherein said first intake valves are opened and closed while said second intake valves are kept closed in response to the detection signal from said rotation sensor representing that the engine speed is a high speed, and said engine is operated in the four-cycle operation.

8. A cycle changeable engine according to claim 1, wherein the cycle change from the two-cycle operation to the four-cycle operation in the cycle change control for changing the operational condition of said engine by said controller is made immediately.

* * * * *